United States Patent [19]

Fisher

[11] Patent Number: 5,155,707
[45] Date of Patent: Oct. 13, 1992

[54] OMNI-DIRECTIONAL HYDROPHONE

[75] Inventor: Stanley A. Fisher, Boyds, Md.

[73] Assignee: The United States of America as represented by the Secretary of the Navy, Washington, D.C.

[21] Appl. No.: 797,880

[22] Filed: Nov. 26, 1991

[51] Int. Cl.$^5$ .............................................. G01B 9/02
[52] U.S. Cl. .................................. 367/149; 356/345; 356/349; 356/358; 359/141; 359/195
[58] Field of Search ....................... 367/141, 149, 169; 356/345, 349, 358; 359/141, 195

[56] References Cited

U.S. PATENT DOCUMENTS

| | | | |
|---|---|---|---|
| 4,446,543 | 5/1984 | McLandrich et al. | 367/149 |
| 4,449,210 | 5/1984 | Meyer | 367/149 |
| 4,527,749 | 7/1985 | Matthews et al. | 242/7.15 |
| 4,624,570 | 11/1986 | Bertollini | 356/373 |
| 4,649,529 | 3/1987 | Avicola | 367/149 |
| 4,994,668 | 2/1991 | Lagakos et al. | 250/227.19 |

OTHER PUBLICATIONS

Lagakos et al, *Optimizing Fiber Coatings for Interferometric Acoustic Sensors*, IEEE Journal of Quantum Electronics, vol. QE-18, No. 4, Apr. 1982.

Ostrowsky, Ed., *Fiber and Integrated Optics*, 1979 Plenum Press, New York, p. 87.

Primary Examiner—J. Woodrow Eldred
Attorney, Agent, or Firm—Charles D. Miller; Gary G. Borda

[57] ABSTRACT

An omni-directional hydrophone having a pair of fiber-optic windings wrapped around a resilient ball to form a spherical acoustic sensor is provided. The fiber-optic pair has a first fiber which has a bonded jacket and a second fiber which has an unbonded jacket. The fiber with the bonded jacket is sensitive to both vibration of the mounting structure and impinging acoustic signals. The fiber with the unbonded jacket is sensitive to vibration but insulated from the acoustic signals. By comparing the signals from the two fibers, the hydrophone detects acoustic signals by detecting the phase difference between the two fibers. As both fibers are equally affected by vibration, there is no phase difference caused by vibration. This mechanization permits the canceling of vibration induced signals while retaining full sensitivity to acoustic signals. The hydrophone uses a standard fiber-optic laser source and detection system to convert the acoustic generated phase change to amplitude dependent voltage signals. The hydrophone is pressure and temperature insensitive.

19 Claims, 2 Drawing Sheets

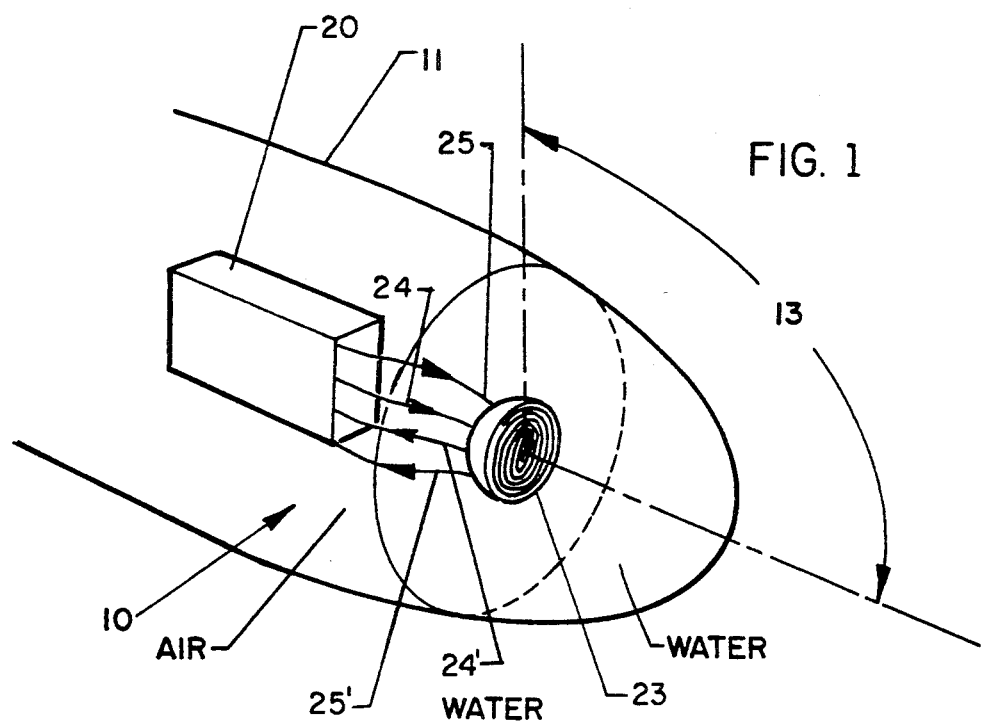
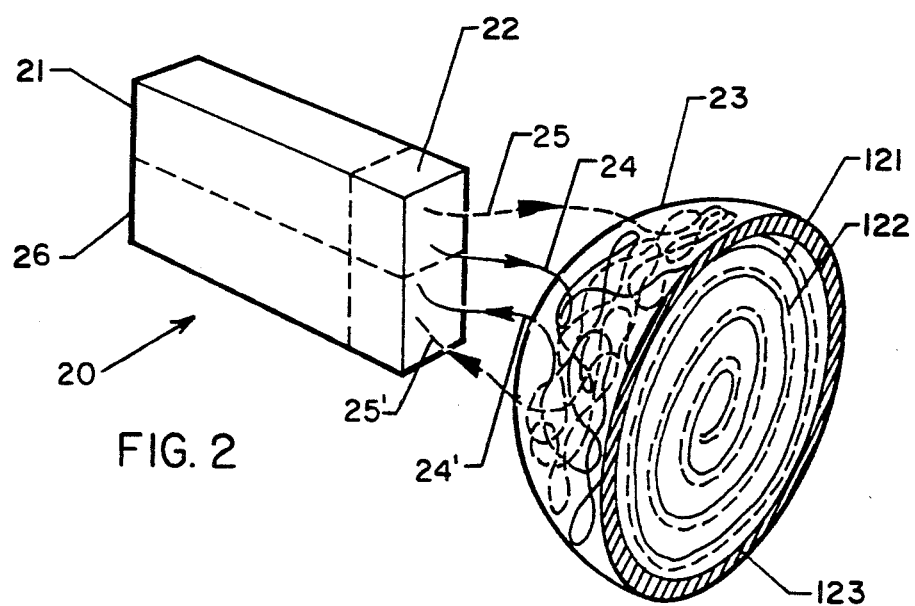

FIG. 3
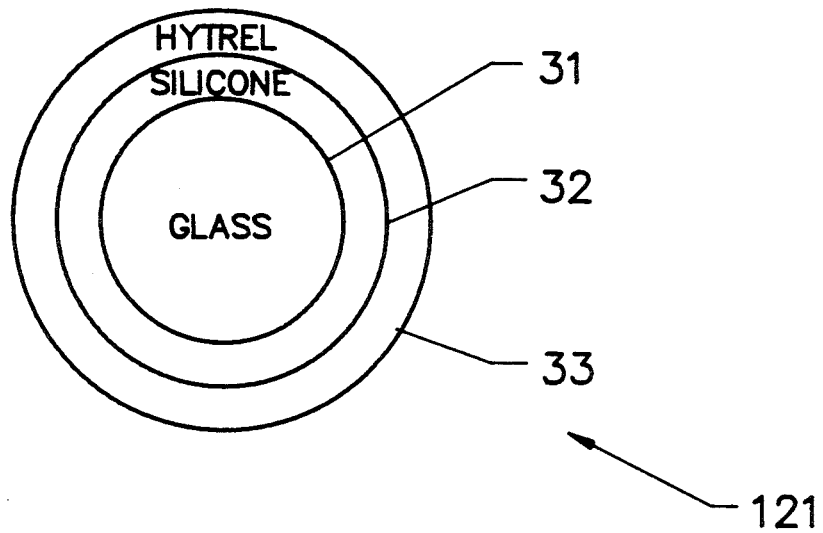
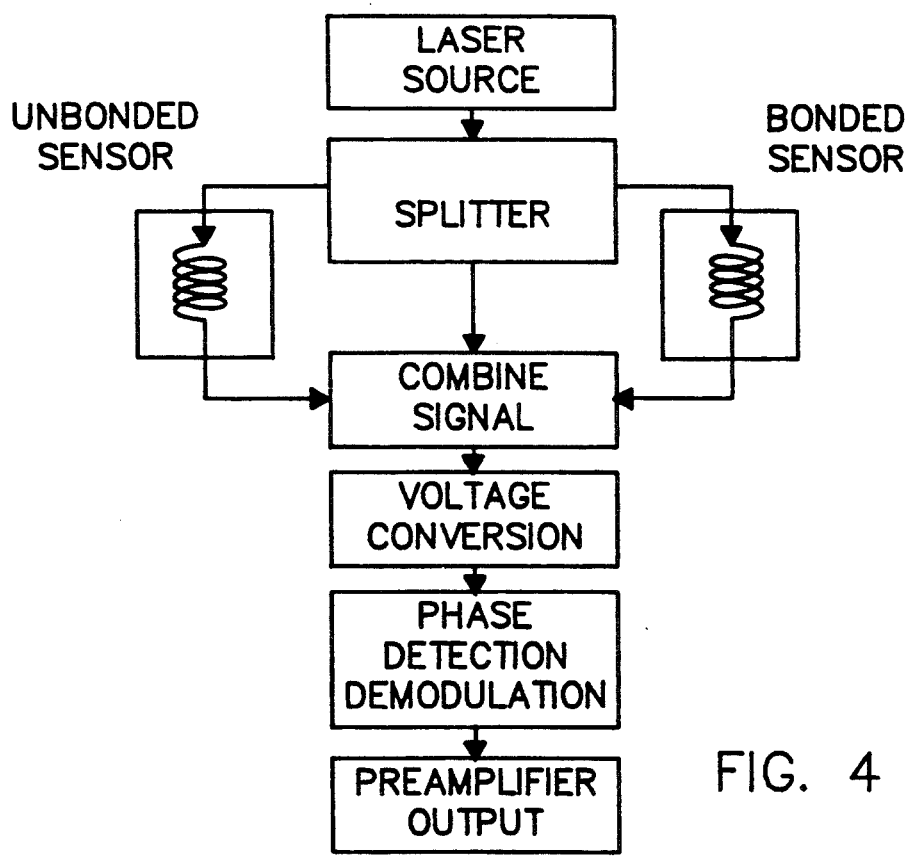
FIG. 4

OMNI-DIRECTIONAL HYDROPHONE

STATEMENT OF GOVERNMENT

The invention described herein may be manufactured and used by or for the the Government of the United States of America for governmental purposes without the payment of any royalties thereon or therefor.

BACKGROUND OF THE INVENTION

1. Field of Invention

The invention relates generally to acoustic sensors and more particularly to fiber-optic acoustic sensors.

2. Brief Description of Related Art

The use of laser interferometers for detection of acoustic signals in a fluid medium is known. Typical prior art devices have been configured by winding an optical fiber onto a pressure sensitive mandrill or by suspending a pressure sensitive fiber in an acoustic medium, typically in a spiral configuration.

The limitations of prior art devices typically used in a moving flow field include the requirement of suspending the array in a manner that does not restrict the acoustic response. This requirement greatly complicates suspension. Prior sensor arrays are typically configured either three-dimensionally or in planar arrays. Planar sensor arrays, while more easily suspended by attachment to a hull or other mounting surface, have limited directional characteristics thus reducing omni-directional operation. The three-dimensional configuration, on the other hand, while exhibiting superior omni-directional capabilities, have increased suspension difficulties thus limiting use in a moving flow field.

In the low wave number domain experienced by hull structures, pressure fluctuations in the turbulent boundary layer induce vibration in the hull structure resulting in vibrational noise. The wavenumber characteristics of the turbulent boundary layer pressure fluctuations have large values at the structural wavenumber response of the hull of underwater vehicles. The hull structure in these circumstances is excited by the boundary layer pressure fluctuations and the resulting vibrations become a significant noise source. Prior sensors are sensitive to this vibration induced noise and, due to the necessity of suppressing vibrational noise, are limited in sensitivity to incident acoustic energy signals. The vibration induced noise and impinging acoustic signals are in the same frequency range and therefore cannot be filtered by conventional means. Therefore, the presence of vibrational noise greatly reduces the effectiveness of prior hydrophone sensors in detecting and isolating acoustic energy signals from the fluid medium. In the case of the omni-directional configuration, the directional characteristics of the array limit the omni-directional sensitivity.

SUMMARY OF THE INVENTION

The invention is a fiber-optic hydrophone having a pair of optical fibers each encased within an acoustically sensitive jacket. One of the optical fibers, the sensing fiber, is enclosed within and continuously bonded to its acoustically sensitive jacket while the other fiber, the reference fiber, is enclosed within, but not bonded to, its protective jacket. The unbonded reference fiber is less sensitive to acoustic energy signals from the fluid medium but remains sensitive to vibration induced noise. Both fibers are wound around an acoustically transparent and resilient ball to form a spherical shape. The entire sensor assembly is then further encapsulated in an acoustically transparent polyurethane material thereby forming a ball-shaped sensor.

The resulting hydrophone is a highly sensitive, omni-directional hydrophone which uses an electronic unit to detect differences in the phase shifts of light traveling through the two optical fibers. Incident acoustic wave signals produce phase shifts in the light traveling through the sensing fiber but not in the light traveling through the reference fiber. The sensing electronics detect this acoustic signal related phase difference. However, as each fiber is affected equally by vibration of the mounting structure, light traveling through each fiber experiences equal vibration induced phase shifts. Since there is no resulting vibration related phase difference between light traveling through the two fibers, none is detected by the sensing electronics. This arrangement effectively cancels vibrational noise.

OBJECTS OF THE INVENTION

It is therefore an object of the invention to provide a fiber-optic hydrophone having improved sensitivity to acoustic signals.

It is a further object of the invention to provide a fiber-optic hydrophone having a reduced sensitivity to vibrational noise.

It is another object of the invention to provide a fiber-optic omni-directional hydrophone.

It is still a further object of the invention to provide a fiber-optic hydrophone having an acoustically-transparent protective structure.

It is yet another object of the invention to provide a lightweight, compact, pressure and temperature insensitive hydrophone.

BRIEF DESCRIPTION OF THE DRAWINGS

The foregoing objects and other advantages of the invention will be better understood from the following description taken with the accompanying drawings wherein like reference numerals refer to like or similar element throughout and wherein:

FIG. 1 is a perspective view of the fiber-optic hydrophone showing a possible installation on an underwater vehicle and further showing a partial cutaway of the acoustic sensor;

FIG. 2 is a partial cutaway perspective view of the fiber-optic hydrophone.

FIG. 3 is a cross sectional view of the optical fiber used to form the sensor of the hydrophone; and FIG. 4 is a diagram depicting the operation of the fiber-optic hydrophone.

DETAILED DESCRIPTION OF THE PREFERRED EMBODIMENT

Referring now to FIG. 1, the hydrophone of the present invention, designated generally by the reference numeral 10, is shown with an exemplary installation in an underwater vehicle 11. The fiber-optic sensor 23 is installed in a free flood area of the underwater vehicle while the light source and detector hardware, shown generally as item 20, is installed in a dry part of the hull. In an alternative embodiment, the entire hydrophone can be installed in a free flood area of the vehicle with the light source and detector hardware being enclosed within a watertight unit. Fiber-optic sensor 23 is connected to light source and detector hardware 20 through sensing fiber leads 24 and 24' and reference fiber leads 25 and 25'.

When installed on an underwater vehicle, the angle defining the cone of sensitivity 13 of the sensor extends from the forward hemisphere aft to approximately thirty degrees (30) behind the beam of the vehicle. Depending on the configuration of the sensor, the cone of sensitivity may be extended further aft using the omni-directional sensor described herein.

FIG. 2 is a cutaway perspective of the omni-directional hydrophone showing its major components, including a laser source 21, a light splitter 22, a fiber-optic sensor 23, sensing and reference fiber leads 24, 24', 25 and 25', and an electro-optic unit 26. Laser source 21 may be any available source providing coherent light. In the preferred embodiment, a laser emitting at a wavelength of 800 nM is used. A second embodiment uses a laser emitting at a wavelength of 1300 nM.

The fiber-optic sensor of the present invention is shown generally as item 23. Energy going to the spherical fiber-optic sensor from a laser light source 21 is split into two parts by splitter 22. One part of the laser light enters the fiber-optic sensor through sensing fiber lead 24, travels through sensing coil 121, exits the fiber-optic sensor through sensing fiber lead 24', and finally enters electro-optic unit 26. A second part of the laser light enters the fiber-optic sensor through reference fiber lead 25, travels through reference coil 122, exits the fiber-optic sensor through reference fiber lead 25', and finally enters electro-optic unit 26.

Sensing coil 121 is formed in a spherical configuration and is encased in an elastomer material 123. The preferred elastomer material is polyurethane. However, any compliant and acoustically transparent material may be used. Reference coil 122 is also formed in a spherical configuration in the same elastomer material and is further arranged in a paired arrangement with the sensing coil. This pattern allows the reference coil to be located adjacent to the sensing coil at all points along the windings. Because both coils lie in approximately the same locations both are subject to the same vibrational inputs. By thus locating the coils in paired windings, vibrational inputs caused by vibration of the structure upon which the spherical fiber-optic sensor is mounted are sensed equally by both sensing coil 121 and reference coil 122.

Referring now to FIG. 3, a cross-section of sensing coil 121 is shown depicting the component layers. The optical fiber of sensing coil 121 consists of centrally located light transmitting glass/silicone optical fiber core 31 and a soft silicone layer 32 which prevents microbending of the optical fiber core, thus, preventing resultant acoustic signal loss. The optical fiber is encased within an acoustically sensitive jacket 33. The preferred material of the acoustically sensitive jacket is Hytrel. The soft silicone layer 32 of sensing coil 121 is bonded to both the optical fiber core 31 and the acoustically sensitive jacket 33.

Reference coil 122 consists of an optical fiber, which comprises a central glass/silicone optical fiber core and a soft silicone layer, encased within an outer acoustically sensitive jacket. Reference coil 22 is structurally similar to sensing coil 121 the only difference being that the acoustically sensitive jacket is not bonded to the optical fiber.

The result of bonding the three layers of the sensing coil together is that the sensing coil is made highly sensitive to acoustic energy. By contrast, the reference coil, without bonding between the acoustically sensitive jacket and the optical fiber, is far less sensitive to and, therefore, insulated from impinging acoustic energy waves. This is an important feature because the vibration induced noise and impinging acoustic signals are in the same frequency range and, therefore, cannot be filtered by conventional means.

It is well known that acoustically sensitive materials deform as a result of pressure fluctuations induced by impinging acoustic energy. The acoustically sensitive jackets of the sensing and reference coils experience such a deformation as a result of impinging acoustic wave signals from the fluid medium. By bonding the acoustically sensitive jacket to the optical fiber of sensing coil 121, deformation of the acoustically sensitive jacket is transferred to the underlying optical fiber. Consequently, the underlying acoustically sensitive optical fiber of sensing coil 121 deforms as a result of pressure fluctuations induced by impinging acoustic energy. The pressure induced strain within the glass/silicone optical fiber core causes changes in both the index of refraction of the glass/silicone core and the length of the optical fiber. The result is a change in the optical path length of light traveling through the optical fiber of the sensing coil.

The unbonded jacket of reference coil 122, on the other hand, does not effectively transmit acoustic energy induced deformation to the underlying acoustically sensitive optical fiber of the reference coil. As a result, the optical path length of light traveling through the reference coil is not effected by impinging acoustic energy. The resulting acoustic energy induced differences in optical path lengths between the sensing and reference coils causes a difference in phase between light traveling through the two coils. This phase difference is detected by electro-optic unit 26.

In contrast, both the sensing and reference coils are affected equally by vibrational input and, therefore, the light traveling through the two coils experiences identical phase shifts due to vibration. Since there is no phase difference between the two coils as a result of vibration, the phase difference of the light traveling through the two coils is directly related to the impinging acoustic energy level.

Upon exiting the fiber-optic sensor, signals from the two coils are recombined, obtaining a phase modulated signal through the Doppler effect. The preferred embodiment of electro-optic unit 26, as shown in FIG. 2, was designed by the Naval Research Laboratory and fabricated by Optech, Inc. using a synthetic heterodyne demodulation technique for interrogating the phase modulated signal. The unit comprises an optical phase detector, a photo-voltage converter and a pre-amplifier.

Operation of the hydrophone may be seen by reference to FIG. 4, wherein a block diagram depicts the functional components of the hydrophone. The laser source provides a coherent light signal to a splitter which sends part of the signal to the bonded sensing coil and part to the unbonded reference coil. The output signals from the two coils are recombined, the phase shift between the sensing and reference coils is detected, thus isolating the impinging acoustic energy signals from the vibration induced noise. The signal is processed to provide a voltage conversion that is proportional to real time acoustic pressure at the sensor. These signals can be used either independently or in acoustic arrays.

The advantages of the present invention are numerous. The omni-directional hydrophone provides a compact, lightweight, compliant spheroid which can be installed in various locations including the interior of any ship or underwater vehicle free flood area, the exterior of any hull structure, or the sea floor. The acoustically transparent elastomer which encapsulates the array of the fiber-optic windings protects the array without reducing the acoustic sensitivity.

Additionally, the hydrophone provides a unique structure in that the sensing and reference coils are everywhere collocated by use of the paired coil windings. The combination of collocated fiber-optic coils and the bonded and unbonded acoustically sensitive jackets on the sensing and reference coils, respectively, provides a unique result. Because both sensing and reference coils are encased within the same elastomer material, both receive identical vibrational inputs. However, only the sensing coil, wherein the acoustically sensitive jacket is bonded to the optical fiber, is affected by acoustic signals. The detection process only measures resultant phase differences, thus effectively canceling any vibration induced signals. This result occurs even though the vibration and acoustic inputs are in the same frequency range.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed is:

1. A vibration-canceling omni-directional fiber-optic hydrophone comprising:
   a spheroid shaped detecting means for detecting acoustic energy, said spheroid shaped detecting means having increased sensitivity to acoustic energy signals and reduced sensitivity to vibrational noise;
   said spheroid shaped detecting means further comprising a first means sensitive to both impinging acoustic energy and vibrational noise, a second means sensitive to vibrational noise only, said second means in close proximity to said first means, and a means for providing coherent light to said first means and said second means; and
   a means for processing output signals from said spheroid shaped detecting means.

2. A vibration-canceling omni-directional fiber-optic hydrophone as in claim 1 wherein said first means is a sensing coil formed with an optical fiber encased within an acoustically sensitive jacket wherein said acoustically sensitive jacket is bonded to the optical fiber.

3. A vibration-canceling omni-directional fiber-optic hydrophone as in claim 2 wherein said second means is a reference coil formed with an optical fiber encased within a protective jacket wherein said protective jacket is not bonded to the optical fiber.

4. A vibration-canceling omni-directional fiber-optic hydrophone as in claim 3 wherein said means for providing coherent light is a laser light source connected to and transmitting light to said reference optical fiber and said sensing optical fiber.

5. A vibration-canceling omni-directional fiber-optic hydrophone as in claim 4 wherein the means for processing output signals from said sensing means is an electro-optic unit connected to and receiving transmitted light from said reference optical fiber and said sensing optical fiber suitable for determining phase shift differences between said sensing and reference optical fibers.

6. A vibration-canceling omni-directional fiber-optic hydrophone as in claim 5 wherein said sensing coil and said reference coil form an omni-directional acoustic sensing spheroid by winding said sensing coil and said reference coil in a collocated pairing around a compliant ball; and
   wherein said omni-directional acoustic sensing spheroid is encapsulated within an acoustically transparent material thereby forming a sealed, compliant spheroid.

7. A vibration-canceling omni-directional fiber-optic hydrophone as in claim 6 wherein said sensing optical fiber further comprises a light transmitting optical fiber core and a soft silicone buffer layer surrounding said optical fiber core between said optical fiber core and said bonded acoustically sensitive jacket; and
   wherein said reference optical fiber further comprises a light transmitting optical fiber core and a soft silicone buffer layer surrounding said optical fiber core between said optical fiber core and said unbonded protective jacket.

8. A vibration-canceling omni-directional fiber-optic hydrophone comprising:
   means for providing coherent light;
   means for receiving coherent light, said receiving means having optical characteristics that vary when subjected to acoustic impingement;
   means for detecting vibration signals, said detecting means having optical characteristics that are insulated from acoustic impingement;
   said means for receiving coherent light and said means for detecting vibration signals configured to form an acoustically sensitive spheroid;
   means for processing output signals from said means for receiving coherent light and said means for detecting vibration signals; and
   means for demodulating processed output signals thereby obtaining a low vibration noise acoustic signal.

9. A vibration-canceling omni-directional fiber-optic hydrophone as in claim 8 wherein said means for providing coherent light is a laser light source.

10. A vibration-canceling omni-directional fiber-optic hydrophone as in claim 9 wherein said laser light source emits light at a wavelength of 800 nM.

11. A vibration-canceling omni-directional fiber-optic hydrophone as in claim 9 wherein said laser light source emits light at a wavelength of 1300 nM.

12. A vibration-canceling omni-directional fiber-optic hydrophone as in claim 8 wherein said means for receiving coherent light comprises a fiber-optic coil having an acoustically sensitive jacket continuously bonded to the fiber-optic coil and said fiber-optic coil wound on a compliant ball of acoustically transparent material.

13. A vibration-canceling omni-directional fiber-optic hydrophone as in claim 11 wherein said acoustically transparent material is polyurethane.

14. A vibration-canceling omni-directional fiber-optic hydrophone as in claim 8 wherein said means for detecting vibration signals comprises a fiber-optic coil having a jacket that is not bonded to the fiber-optic coil and said fiber-optic coil wound on a compliant ball of acoustically transparent material.

15. A vibration-canceling omni-directional fiber-optic hydrophone as in claim 14 wherein said acoustically transparent material is polyurethane.

16. A vibration-canceling omni-directional fiber-optic hydrophone as in claim 8 wherein said means for receiving coherent light and said means for detecting vibration signals each comprise a fiber-optic coil with the coils wound in a collocated pair around a compliant ball.

17. A vibration-canceling omni-directional fiber-optic hydrophone as in claim 8 wherein said means for processing output signals is an optical-electronic processor having an optical phase detector, photo-voltage converter, and preamplifier.

18. A vibration-canceling omni-directional fiber-optic hydrophone as in claim 8 wherein said means for demodulating is a device using synthetic heterodyne demodulation.

19. A vibration-canceling omni-directional fiber-optic hydrophone comprising:
   a sensing coil formed with an optical fiber encased within an acoustically sensitive jacket wherein said acoustically sensitive jacket is bonded to the optical fiber and wherein said optical fiber further comprises a light transmitting optical fiber core and a soft silicone buffer layer surrounding said optical fiber core between said optical fiber core and said bonded acoustically sensitive jacket;
   a reference coil formed with an optical fiber encased within a protective jacket wherein said protective jacket is not bonded to the optical fiber and wherein said optical fiber further comprises a light transmitting optical fiber core and a soft silicone buffer layer surrounding said optical fiber core between said optical fiber core and said unbonded protective jacket;
   an omni-directional acoustic sensing spheroid formed by winding said sensing coil and said reference coil in a collocated pairing around a compliant ball;
   an acoustically transparent material encapsulating said omni-directional acoustic sensing spheroid thereby forming a sealed, compliant spheroid;
   a coherent light source connected to and transmitting light to said reference optical fiber and said sensing optical fiber; and
   an electro-optic unit connected to and receiving transmitted light from said reference optical fiber and said sensing optical fiber suitable for determining phase shift differences between said sensing and reference optical fibers.

* * * * *